(12) United States Patent
Beck et al.

(10) Patent No.: US 7,755,466 B2
(45) Date of Patent: Jul. 13, 2010

(54) FLIP-CHIP FLOW SENSOR

(75) Inventors: Scott E. Beck, Murphy, TX (US);
Gilberto Morales, Arlington, TX (US)

(73) Assignee: Honeywell International Inc., Morristown, NJ (US)

( * ) Notice: Subject to any disclaimer, the term of this patent is extended or adjusted under 35 U.S.C. 154(b) by 1113 days.

(21) Appl. No.: 11/412,460

(22) Filed: Apr. 26, 2006

(65) Prior Publication Data

US 2007/0251292 A1    Nov. 1, 2007

(51) Int. Cl.
*H01C 3/04* (2006.01)
(52) U.S. Cl. .............................. 338/25; 338/20; 73/721; 257/419
(58) Field of Classification Search ............. 338/20–25; 73/721, 724; 257/419
See application file for complete search history.

(56) References Cited

U.S. PATENT DOCUMENTS

| | | | |
|---|---|---|---|
| 4,320,655 A | 3/1982 | Kammermaier et al. | |
| 5,086,745 A | 2/1992 | Nishimura et al. | |
| 5,233,868 A | 8/1993 | Coats et al. | |
| 5,322,816 A | 6/1994 | Pinter | 437/203 |
| 5,511,428 A | 4/1996 | Goldberg et al. | |
| 5,620,929 A | 4/1997 | Hosoi et al. | 438/50 |
| 6,107,109 A | 8/2000 | Akram et al. | 438/15 |
| 6,184,773 B1 | 2/2001 | Bonne et al. | 338/25 |
| 6,294,837 B1 | 9/2001 | Akram et al. | 257/774 |
| 6,308,553 B1 | 10/2001 | Bonne et al. | 73/1.35 |
| 6,460,411 B1 * | 10/2002 | Kersjes et al. | 73/204.26 |
| 6,495,452 B1 | 12/2002 | Shih | 438/643 |
| 6,548,895 B1 | 4/2003 | Benavides et al. | 257/712 |
| 6,553,808 B2 | 4/2003 | Bonne et al. | 73/24.01 |
| 6,684,694 B2 | 2/2004 | Fujiwara et al. | 73/204.26 |
| 6,698,238 B1 | 3/2004 | Cheng | 62/23 |
| 6,716,737 B2 | 4/2004 | Plas et al. | 438/612 |
| 6,790,775 B2 | 9/2004 | Fartash | 438/667 |
| 6,794,981 B2 | 9/2004 | Padmanabhan et al. | 338/25 |
| 2003/0010111 A1 | 1/2003 | Wado et al. | 73/204.26 |
| 2004/0026365 A1 | 2/2004 | Fuertsch et al. | 216/39 |

(Continued)

FOREIGN PATENT DOCUMENTS

EP    563213    6/1896

(Continued)

OTHER PUBLICATIONS

*A Through-Wafer Interconnect in Silicon for RFICs*, J.H. Wu, J. Scholvin, J.A. del Alamo; IEEE Transanction on Electron Devices vol. 51, No. 11, Nov. 2004.

(Continued)

*Primary Examiner*—Kyung Lee

(57) ABSTRACT

A flip-chip flow sensor has electrical components, such as temperature sensors and a heater, on the top of a substrate and has a channel formed in the bottom of the substrate. The channel is separated from the substrate's top by a membrane of substrate material. A fluid flowing through the channel is separated from a heater, upstream temperature sensor, downstream temperature sensor, bond pads, and wire bonds by the membrane. Heat flows through the membrane easily because the membrane is thin. As such, the electrical elements of the flow sensor, the bond pads and the wires are physically separated from a fluid flowing through the channel but can function properly because they are not thermally isolated.

19 Claims, 5 Drawing Sheets

U.S. PATENT DOCUMENTS

| | | | | |
|---|---|---|---|---|
| 2004/0099057 | A1 | 5/2004 | Hornung et al. | 73/204.26 |
| 2005/0020007 | A1* | 1/2005 | Weber et al. | 438/238 |

FOREIGN PATENT DOCUMENTS

| | | |
|---|---|---|
| EP | 0131318 A1 | 1/1985 |
| EP | 0137687 A1 | 4/1985 |
| EP | 0696725 A1 | 2/1996 |
| EP | 1094306 A1 | 4/2001 |
| EP | 1116939 A2 | 7/2001 |
| EP | 1348937 A2 | 10/2003 |
| EP | 1365216 A1 | 11/2003 |
| EP | 1615000 A1 | 1/2006 |
| EP | 1615005 A1 | 1/2006 |
| JP | 07159215 A | 6/1995 |
| WO | WO 9836247 | 8/1998 |
| WO | WO 0037895 | 6/2000 |
| WO | WO 01/84087 A1 | 11/2001 |
| WO | WO 2004/088255 A2 | 10/2004 |

OTHER PUBLICATIONS

*Advanced Processing Techniques for Through-Wafer Interconnects*, S.L. Burkett, X. Qiao, D. Temple and B. Stoner, G. McGuire; J. Vac. Sci. Technol. B22(1), Jan./Feb. 2004.

*Process Compatible Polysilicon-Based Electrical Through-Wafer Interconnects in Silicon Substrates*, E.M. Chow, V. Chandrasekaran, A. Partridge, T. Nishida, M. Sheplak, C F. Quate, T.W. Kenny; Journal of Microelectromechanical Systems, vol. 11, No. 6, Dec. 2002.

*Cantilever-Type Microelectromechanical Systems Probe Card with Through-Wafer Interconnects for Fine Pitch and High-Speed Testing*; BH Kim, HC Kim, K. Chun, J. Ki, Y. Tak,; The Japan Society of Applied Physics.

*Through-Wafer Interconnect Technology for Silicon*; V.G. Kutchoukov, M. Shikida, J.R. Mollinger, A. Bossche,; J. Micromech. Microeng. 14 (2004) 1029-1036.

*High Density, High Aspect Ratio Through-Wafer Electrical Interconnect Vias for MEMS Packaging*; S.J. Ok, C. Kim, D.F. Baldwin; IEEE Transactions on Advanced Packaging, vol. 26 No. 3 Aug. 2003.

*Through-wafer Copper Electroplating for Three-Dimensional Interconnects*; N.T. Nguyen, E. Boellaard, N.P. Pham, V.G. Kutchoukov, G. Craciun, P.M. Sarro; J. Micromech. Microeng 12 (2002) 395-399.

*Through-Wafer Electrical Interconnect for Multilevel Microelectromechanical System Devices*, A. Mehra, X. Zhang and A.A. Ayon, I.A. Waitz, M.A. Schmidt; J. Vac. Sci. Technol. B 18(5), Sep./Oct. 2000.

* cited by examiner

FLIP-CHIP FLOW SENSOR

TECHNICAL FIELD

Embodiments relate to flow sensors and sensor systems. Embodiments also relate to using temperature sensors on either side of a heater to measure fluid flows.

BACKGROUND OF THE INVENTION

The measurement of fluid flows is important in manufacturing, medicine, environmental monitoring, and other areas. One type of flow sensor measures the rise in temperature of a fluid flowing past a heater. Smaller temperature rises correspond to faster flow. Gases and liquids are both fluids and their flow rates can be measured by flow sensors that include temperature sensors and heaters.

Current technology provides systems and methods for producing temperature sensors and heaters on substrates using well-established semiconductor processing techniques. Those skilled in the art of semiconductor manufacturing are familiar with these system and methods such as photolithography, deposition, vapor deposition, etch, wet etch, plasma etch, reactive ion etch, as well as numerous other processes.

Many measurable fluids and gases react chemically with fluid flow sensors and bond pads because some of the sensor materials and the fluid come into contact and because they are reactive. Additionally, wire bonds made on the surface exposed to the gas or liquid being measured may interact with the flow or may be corroded by the flow material. Aspects of the embodiments directly address the shortcoming of current technology by preventing the fluid from contacting the reactive sensor materials.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments to provide a substrate such as a wafer typically used in semiconductor processing. The substrate can be a silicon wafer, a glass wafer, a quartz wafer, a silicon on insulator (SOI) wafer, or another type a wafer. The substrate has a top and a bottom.

Semiconductor processing techniques can be used to form an upstream temperature sensor, downstream temperature sensor, and heater. A fluid flowing through a channel formed in the bottom of the substrate has a flow direction that takes the fluid from an inlet to an outlet. As such, the fluid flows into the inlet, past the upstream temperature sensor first, then the heater, then the downstream temperature sensor, and finally out the outlet. A flow sensor can have an inlet temperature sensor that measures the fluid temperature at the inlet. A flow sensor can also have a substrate temperature sensor that is positioned away from the channel. The temperature sensors and the heater are on the top of the substrate and the channel is formed into the bottom of the substrate.

Being formed into the substrate bottom, the channel top is separated from the substrate top by a membrane of substrate material. A fluid flowing through the channel cannot contact the upstream sensor, heater, downstream sensor, bond pads, and wire bonds because they are on the other side of the membrane.

The substrate material can have high thermal conductance. Ideally, heat can flow through the membrane easily. Heat flowing through the rest of the substrate, however, can reduce a flow sensor's sensitivity, accuracy, and precision. A thermal dam around the membrane can protect the sensor from spurious heat flows.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

Figure 1:
FIG. 1 illustrates a side view of a substrate in accordance with aspects of the embodiments.

FIG. 1 illustrates a side view of a substrate 101 in accordance with aspects of the embodiments. The substrate can be a wafer of silicon, glass, quartz, or another material as are commonly used in semiconductor manufacturing.

Figure 2:
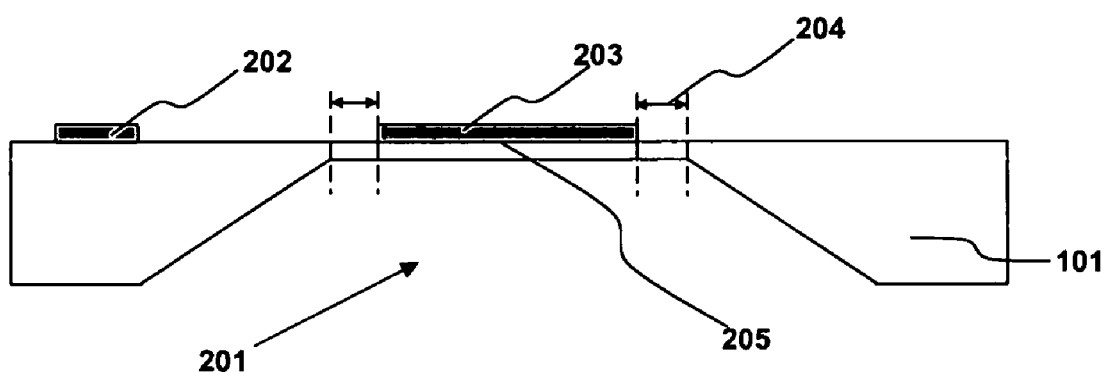
FIG. 2 illustrates a side view of a flow sensor in accordance with aspects of the embodiments.

FIG. 2 illustrates a side view of a flow sensor in accordance with aspects of the embodiments. A channel 201 in the bottom of the substrate 101 is separated from the substrate top by a membrane 205. A substrate temperature sensor 202 is positioned away from the channel 201. Other sensor elements 203 are on top of the membrane 205. An inset distance 204 separates the sensor elements 203 from the edge of the channel 201.

The membrane must be thick enough to be physically robust and thin enough to allow heat to easily pass between the channel the substrate top. Experimental results have revealed that silicon and quartz membranes can be used with membrane thickness ranging from 0.02 mm to 0.08 mm.

Thinner and thicker membranes can be used to meet other sensor requirements such as increased robustness.

When using silicon based processing, an anisotropic crystallographic orientation dependent etching can be used to produce sloped channel sidewalls. Typically, a wet etch process, such as KOH processes, TMAH processes, EDA processes, or EDP processes, is used. Deep reactive ion etching can be used to produce sidewalls that are nearly perpendicular to the substrate surface. KOH is potassium hydroxide, TMAH is trimethylammonium hydroxide, EDA is ethylenediamine, and EDP is ethylenediamine pyrocatechol.

Plasma etching can be used to form a channel in silicon dioxide based glass substrates. Monocrystalline quartz can be anisotropically etched with hydrofluoric acid and anhydrous HF. HF is hydrogen fluoride.

Figure 3:
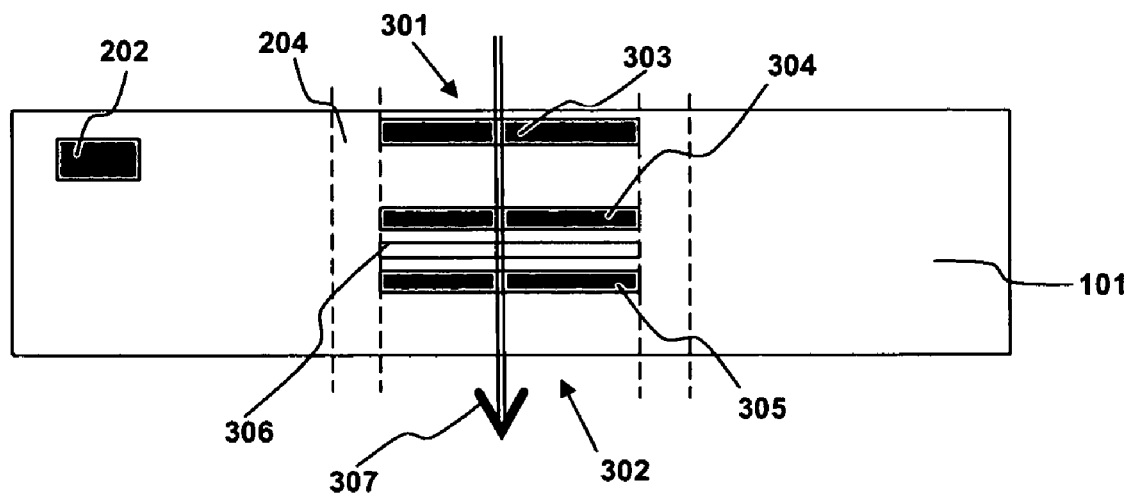
FIG. 3 illustrates a top view of a flow sensor in accordance with aspects of the embodiments.

FIG. 3 illustrates a top view of a flow sensor in accordance with aspects of the embodiments. Fluid can flow into an inlet 301, through the channel, and out of an outlet 302. The flow direction 307 is the direction fluid flows. An inlet temperature sensor 303 can be used to measure the fluid temperature as it enters the channel. An upstream temperature sensor 304 is used to measure the fluid temperature immediately before the fluid reaches a heater 306. A downstream temperature sensor 305 is used to measure the fluid temperature immediately after the fluid passes the heater 306. The substrate temperature sensor 202 is positioned away from the channel. FIG. 3 illustrates a view of the system of FIG. 2 from above.

The heater can be a resistive element that heats up when an electric current passes through it. Heaters can comprise materials such as, platinum, permalloy (NiFe), chrome silicon (CrSi), doped silicon thin film resistors or other types of silicon-based resistors, nickel chrome (NiCr), tantalum, and nickel.

A material that repeatedly and predictably changes resistance in a repeatable and predictable manner when heated or cooled can be used as a temperature sensor. Temperature sensors can comprise materials such as, platinum, permalloy (NiFe), chrome silicon (CrSi), doped silicon thin film resistors or other types of silicon-based resistors, nickel chrome (NiCr), tantalum, and nickel.

Figure 4:
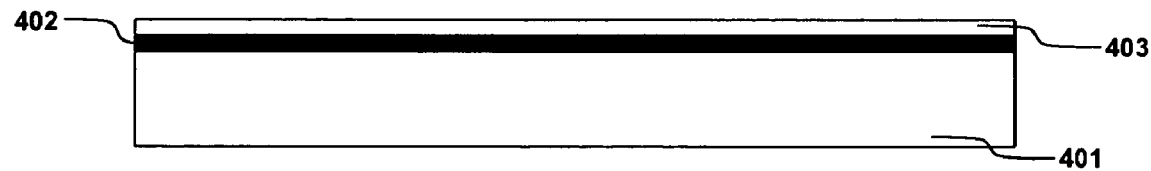
FIG. 4 illustrates a side view of a silicon on insulator substrate in accordance with aspects of some embodiments.

FIG. 4 illustrates a side view of a silicon on insulator (SOI) substrate in accordance with aspects of some embodiments. An SOI substrate can comprise a handler substrate 401, an insulating layer 402, and an upper layer 403. For example, silicon wafers can be used as handler substrates 401, the insulating layer can be a thermal insulator 402 such as silicon dioxide or silicon nitride, and the upper layer 403 can be a silicon layer. A silicon nitride insulating layer can have a silicon oxide upper layer. A major advantage of using an SOI substrate is that the thickness of the insulating layer and the upper layer can be accurately controlled across the entire substrate. Either of those layers can be used as an etch stop layer resulting uniform and repeatable membrane thickness. Those practiced in the art of semiconductor manufacturing know of many varieties of SOI substrates.

Figure 5:
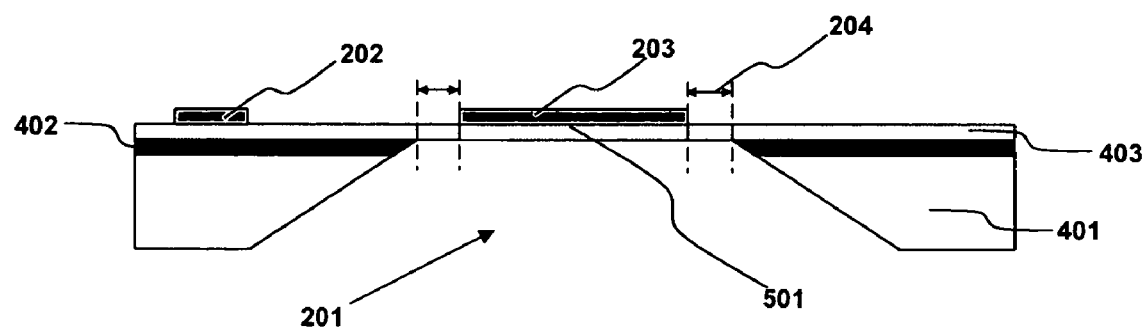
FIG. 5 illustrates a side view of a flow sensor on a silicon on insulator substrate in accordance with aspects of some embodiments.

FIG. 5 illustrates a side view of a flow sensor on a silicon on insulator substrate in accordance with aspects of some embodiments. FIG. 5 is similar to FIG. 2 with a few exceptions. The membrane 501 consists of material from the upper layer 403. Furthermore, sensor elements 203 and the substrate temperature sensor 202 are illustrated as being positioned on the upper layer 403. The substrate temperature sensor 202 can also be positioned on the handler substrate 401 by etching a hole through the upper layer 403 and the insulting layer 402 and positioning a substrate temperature sensor within the hole.

Figure 6:
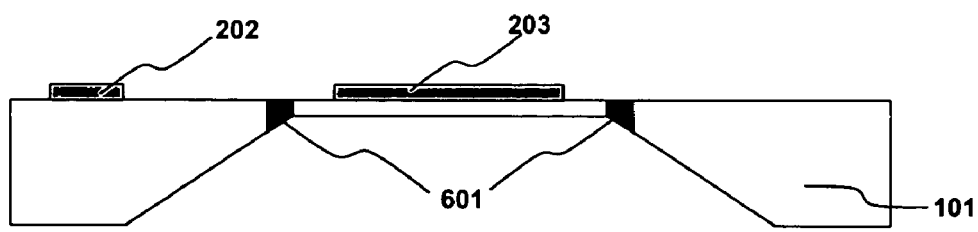
FIG. 6 illustrates a side view of a flow sensor having a thermal dam in accordance with aspects of the embodiments.

FIG. 6 illustrates a side view of a flow sensor having thermal dams 601 in accordance with aspects of the embodiments. A thermal dam 601 can be produced using lithography and oxidation processes. A thermal dam 601 can also be produced using lithography, etch, and fill processes. When etch process are used to produce the thermal dam, the channel should be produced after the thermal dam 601 because otherwise the membrane can be freed from the substrate 101 during processing. The thermal dam can comprise silicon dioxide, silicon nitride, silicon oxynitride, or a polymeric material such as polyimide.

Figure 7:
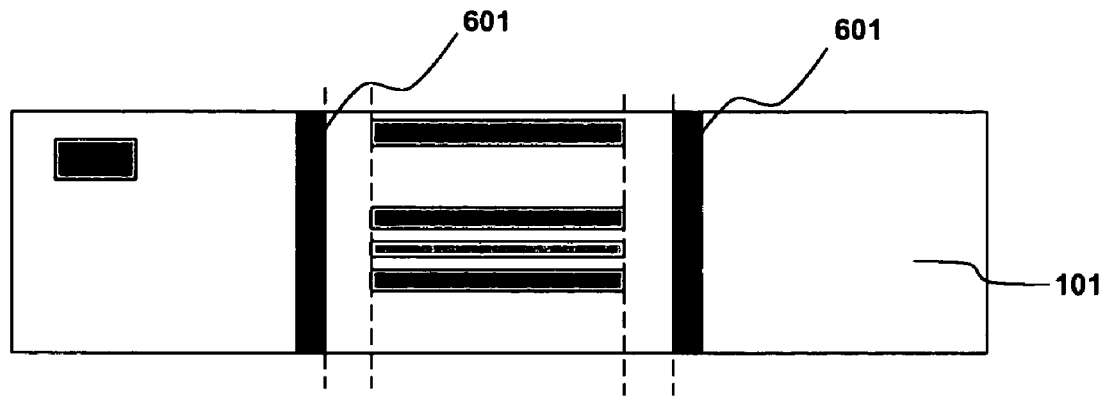
FIG. 7 illustrates a top view of a flow sensor having a thermal dam in accordance with aspects of certain embodiments.

FIG. 7 illustrates a top view of a flow sensor having thermal dams 601 in accordance with aspects of certain embodiments. FIG. 7 is similar to FIG. 3 with the addition of the thermal dams 601. FIG. 7 illustrates a view of the system of FIG. 6 from above.

Figure 8:
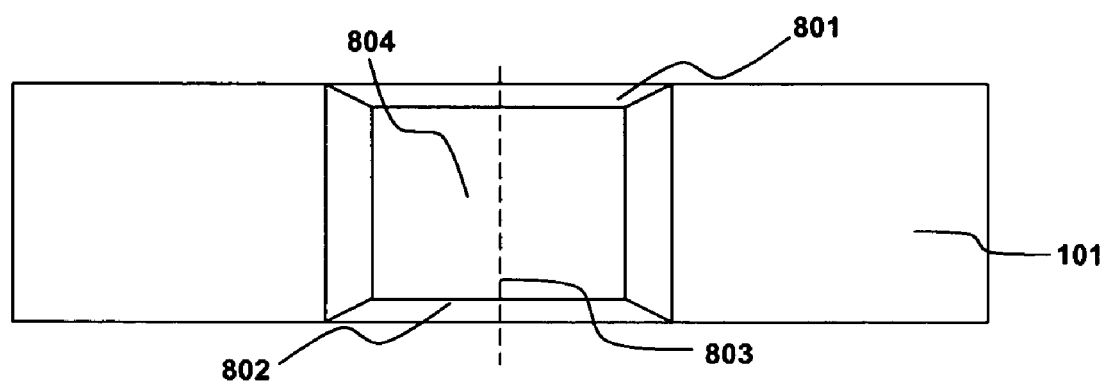
FIG. 8 illustrates a top view of a substrate having a trapezoidal channel in accordance with aspects of certain embodiments.

FIG. 8 illustrates a bottom view of a substrate 101 having a trapezoidal channel 804 in accordance with aspects of certain embodiments. The channel 804 has a sloped sidewall at the inlet 801 and at the outlet 802. Trapezoidal channels leave thicker sections of substrate at the inlet 801 and outlet 802. Flow sensors with trapezoidal channels are more robust than those with straight channels, such as those illustrated in FIGS. 2-3. A more robust sensor can better survive handling and dicing operations. A common semiconductor manufacturing operation, dicing is the process of cutting individual units from a substrate that can have thousands of units. A cut line 803 is illustrated to facilitate understanding of the cut view of FIG. 9.

Figure 9:
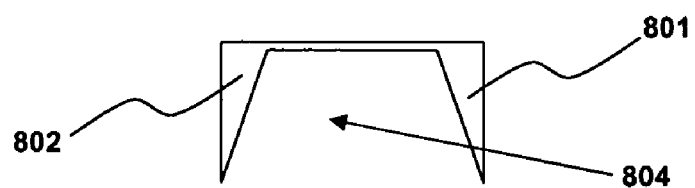
FIG. 9 illustrates a cut view of a substrate having a trapezoidal channel in accordance with aspects of certain embodiments.

FIG. 9 illustrates a cut view of a substrate 101 having a trapezoidal channel 804 in accordance with aspects of certain embodiments. The cut view is edge on along the cut line 803 of FIG. 8. The thicker material and sloping sidewalls of the channel 804 at the inlet 801 and outlet 802 can be seen.

Figure 10:
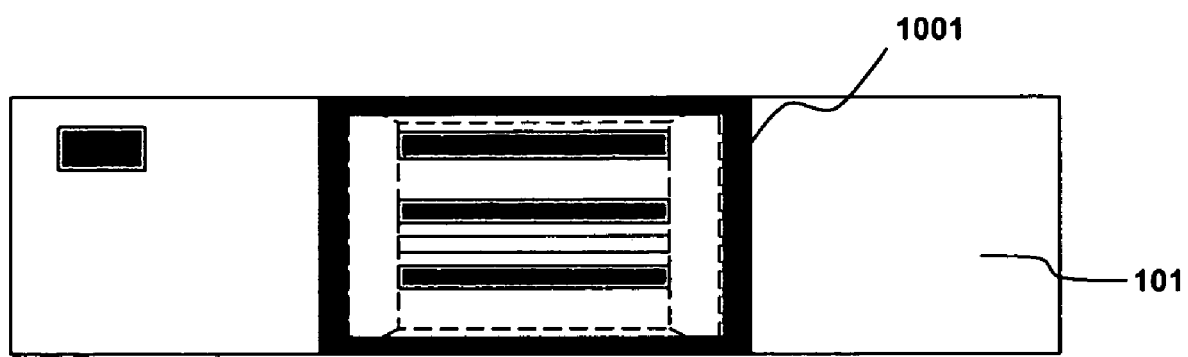
FIG. 10 illustrates a top view of a flow sensor having a thermal dam enclosing the membrane in accordance with aspects of certain embodiments.

FIG. 10 illustrates a top view of a flow sensor having a thermal dam 1001 enclosing the membrane in accordance with aspects of certain embodiments. Thicker material at the inlet and the outlet, as illustrated in FIGS. 9-10, can increase a flow sensor's sensitivity to spurious heat flows conducted by the substrate. Introducing thermal dams at the inlet and the outlet can mitigate this sensitivity. As such, a continuous thermal dam 1001 encloses the area of the membrane containing the upstream temperature sensor, the heater, and the downstream temperature sensor.

Figure 11:
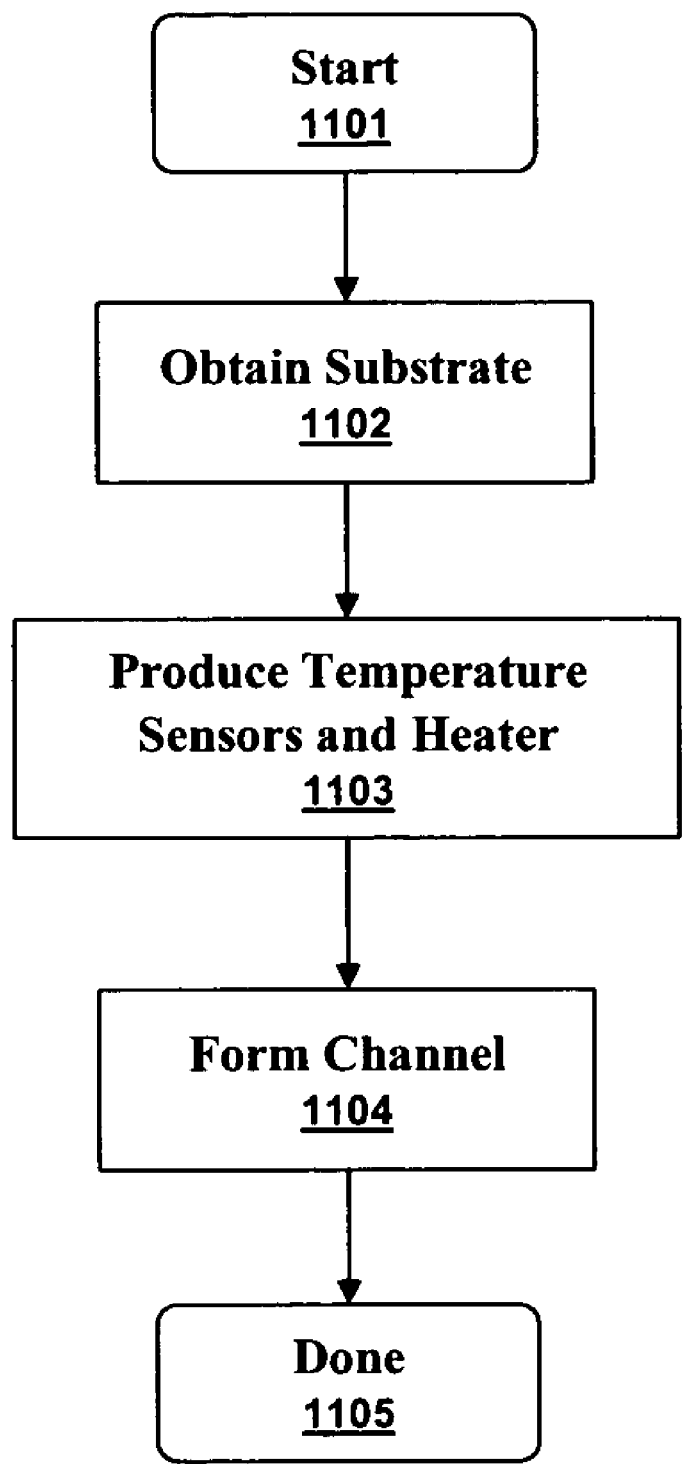
FIG. 11 illustrates a high level flow diagram of producing a flow sensor in accordance with aspects of the embodiments.

FIG. 11 illustrates a high level flow diagram of producing a flow sensor in accordance with aspects of the embodiments. After the start 1110 a substrate is obtained 1102. A heater and temperature sensors, such as upstream temperature sensors, downstream temperature sensors, inlet temperature sensors, and substrate temperature sensors are produced 1103 on the top of the substrate. Next, a channel is formed 1104 on the bottom of the substrate and the process is done 1105. Further processing, such as dicing, may be necessary. Furthermore, electrical connections to the heater and temperature sensors can be established. Those skilled in the art of semiconductor processing know of many methods, such as producing contact pads and wire bonding, for establishing electrical contact to components on a substrate.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows.

Having thus described the invention what is claimed is:

1. A system comprising:
a substrate having a substrate top side and a substrate bottom side;
a heating element on the substrate top side;
an upstream temperature sensor on the substrate top side, wherein the upstream temperature sensor is positioned upstream of the heating element and is configured to sense a measure related to a first temperature of a fluid passing adjacent the substrate bottom side before the fluid reaches the heating element;
a downstream temperature sensor on the substrate top side, wherein the downstream temperature sensor is positioned downstream of the heating element and is configured to sense a measure related to a second temperature of the fluid after the fluid passes the heating element;
a channel in the substrate forming at least part of the substrate bottom side under the upstream temperature sensor, the downstream temperature sensor, and the heater, such that a fluid can flow through the channel in a flow direction, a first end of the channel defining a channel inlet, wherein the fluid enters the channel at the inlet;
the substrate having a membrane forming a top side of the channel and supporting the upstream temperature sensor, the downstream temperature sensor, and the heater above the channel;
a thermal dam that thermally isolates at least part of the membrane from the remainder of the substrate; and
an inlet temperature sensor on the substrate top side, upstream of the upstream temperature sensor and adjacent the channel inlet.

2. The system of claim 1 further comprising a substrate temperature sensor positioned away from the channel and on the substrate top side.

3. The system of claim 1 wherein the substrate comprises silicon.

4. The system of claim 1 wherein the substrate comprises glass.

5. The system of claim 1 wherein the substrate comprises quartz.

6. The system of claim 1 wherein the substrate is a silicon on insulator (SOI) substrate comprising a silicon layer over an insulator layer on a handler wafer, and wherein the membrane comprises the silicon layer and/or the insulator layer.

7. A system comprising:
a substrate having a substrate top side and a substrate bottom side, wherein the substrate is a silicon on insulator (SOI) substrate comprising a silicon layer over an insulator layer on a handler wafer;
a channel etched into the substrate bottom side such that a fluid flowing along a flow direction can flow through the channel;
a membrane adjacent the substrate top side, the membrane having a top side and a bottom side, wherein at least part of the bottom side of the membrane defines a top side of the channel, and wherein the membrane includes the silicon layer but not the insulator layer;
an upstream temperature sensor on the top side of the membrane and a downstream temperature sensor on the top side of the membrane, wherein the downstream temperature sensor is further along the flow direction than the upstream temperature sensor;
a heating element on the top side of the membrane, and positioned between the upstream temperature sensor and the downstream temperature sensor such that the upstream temperature sensor measures a first temperature of the fluid upstream of the heating element and the downstream temperature sensor measure a second temperature of the fluid downstream of the heating element;
a thermal dam that thermally isolates at least part of the membrane from the substrate.

8. The system of claim 7 further comprising an inlet temperature sensor on the substrate top side over an inlet wherein the fluid enters the channel at the inlet.

9. The system of claim 7 further comprising a substrate temperature sensor positioned away from the membrane and channel.

10. The system of claim 7 wherein the substrate comprises silicon.

11. The system of claim 7 wherein the substrate comprises glass.

12. The system of claim 7 wherein the substrate comprises quartz.

13. The system of claim 7 further comprising:
an inlet temperature sensor on the substrate top side over an inlet; and
a substrate temperature sensor positioned away from the membrane and channel, wherein the substrate comprises silicon and wherein the fluid enters the channel at the inlet.

14. A method comprising:
obtaining a substrate having a substrate top side and a substrate bottom side;
producing an upstream temperature sensor, a downstream temperature sensor, and a heating element on the substrate top side over a membrane area wherein the heating element is between the upstream temperature sensor and the downstream temperature sensor such that the upstream temperature sensor measures a first temperature of the fluid upstream of the heating element and the downstream temperature sensor measure a second temperature of the fluid downstream of the heating element;
forming a thermal dam that thermally isolates at least part of the membrane area from the substrate;
forming a channel in the substrate bottom side such that a membrane is created in the membrane area and such that a fluid flowing through the channel passes adjacent the upstream temperature sensor before passing adjacent the downstream temperature sensor thereby producing a flow sensor; and
producing an inlet temperature sensor on the substrate top side such that the inlet temperature sensor is over an inlet wherein the fluid enters the channel at the inlet.

15. The method of claim 14 further comprising producing a substrate temperature sensor on the substrate top side such that the substrate temperature sensor is positioned away from the channel.

16. The method of claim 14 wherein the substrate comprises silicon.

17. The method of claim 14 wherein the substrate comprises glass.

18. The method of claim 14 wherein the substrate comprises quartz.

19. The method of claim 14 wherein the substrate is a silicon on insulator (SOI) substrate comprising a silicon layer over an insulator layer on a handler wafer, and wherein the channel is formed by etching away a portion of the handler wafer and insulator layer.

* * * * *